United States Patent [19]
Bopp

[11] Patent Number: 5,456,336
[45] Date of Patent: Oct. 10, 1995

[54] WHEEL BRAKE FOR SHOPPING CARTS

[76] Inventor: Robert D. Bopp, Rte. 2, Box 442, Ridgedale, Mo. 65739

[21] Appl. No.: 341,146

[22] Filed: Nov. 16, 1994

[51] Int. Cl.[6] ....................................................... B60T 1/06
[52] U.S. Cl. ................... 188/17; 188/20; 188/19; 188/26; 188/166
[58] Field of Search ................... 188/20, 2 F, 16, 188/17, 19, 21, 26, 58, 64, 67, 77 R, 77 W, 82.6, 145, 146, 166, 167, 259, 265, 336; 192/81 C; 301/6.1, 6.2

[56] References Cited

U.S. PATENT DOCUMENTS

| | | |
|---|---|---|
| 2,253,824 | 8/1941 | Townsend et al. |
| 2,777,546 | 1/1957 | Kelley . |
| 3,323,750 | 6/1967 | Worth et al. .......................... 188/166 X |
| 3,405,791 | 10/1968 | Kaplan ................................. 188/166 X |
| 3,630,322 | 12/1971 | Keely et al. ....................... 188/77 W X |
| 3,897,857 | 8/1975 | Rodaway . |
| 4,055,935 | 11/1977 | Malion et al. .................... 188/77 W X |
| 4,143,442 | 3/1979 | Harlang . |
| 4,257,497 | 3/1981 | Schroeder . |
| 4,313,530 | 2/1982 | Boyd ................................. 188/82.6 X |
| 4,318,204 | 3/1982 | Black . |
| 4,614,257 | 9/1986 | Harada et al. .................... 188/77 W X |
| 4,633,544 | 1/1987 | Hicks . |
| 4,815,679 | 3/1989 | Perry ................................. 188/2 D X |
| 5,002,163 | 3/1991 | Kidd . |
| 5,140,720 | 8/1992 | Sisler . |
| 5,328,007 | 7/1994 | Yokozuka et al. ............... 188/77 W X |
| 5,400,883 | 3/1995 | Ojima et al. ...................... 188/82.6 X |

FOREIGN PATENT DOCUMENTS

| | | |
|---|---|---|
| 773603 | 11/1934 | France . |
| 1461474 | 12/1966 | France . |
| 2636542 | 2/1978 | Germany . |
| 159632 | 1/1933 | Switzerland . |
| 1393703 | 5/1988 | U.S.S.R. . |

OTHER PUBLICATIONS

"Making Shopping Carts Safer For Kids and Cars", Dow Jones & Co., 1992.

Primary Examiner—Robert J. Oberleitner
Assistant Examiner—Alfred Muratori
Attorney, Agent, or Firm—Laubscher & Laubscher

[57] ABSTRACT

A wheel brake assembly for shopping carts is characterized by a hub adapted for rotation about an axis, a coil spring coaxially mounted on the hub, and a pair of annular disks coaxially mounted on the spring. One of the disks is stationary and has one end of the spring connected therewith. The other disk is rotatable and has the other end of the spring connected therewith. Rotation of the rotatable disk in one direction to a braking position draws the spring ends together so that the coil spring constricts on the hub to prevent rotation of the hub about the axis. Rotation of the rotatable disk in the other direction to a release position pushes the spring ends apart to relax the coil spring and allow the hub to rotate.

10 Claims, 4 Drawing Sheets

WHEEL BRAKE FOR SHOPPING CARTS

BACKGROUND OF THE INVENTION

Every year, millions of dollars in damage is caused by downhill runaway or wind blown shopping carts. While efforts have been made to eliminate this problem, the efforts normally require active operation by the user of the shopping cart, such as flipping a lever, pulling a knob, or stepping on a latch or lever. Unfortunately, most people do not think to activate a braking mechanism once they are done with the shopping cart, and the unattended cart is then free to move about in accordance with environmental or gravity-induced conditions.

The present invention relates to an inexpensive automatic braking system for wheels of user manipulated vehicles such as shopping carts, wheelchairs, or other types of transport vehicles.

BRIEF DESCRIPTION OF THE PRIOR ART

Braking mechanisms for the wheels of shopping carts, wheelchairs and the like are well-known in the patented prior art as evidenced by the U.S. patents to Rodaway U.S. Pat. No. 3,897,857, Hicks U.S. Pat. No. 4,633,544, and Kidd U.S. Pat. No. 5,022,163. The Hicks and Kidd patents disclose friction wheel assemblies for shopping carts for retarding rotation of at least one wheel of the cart to prevent runaway. A major drawback of these devices is that they have a complex structure and are thus expensive and the continuous friction applied to the wheels make the carts difficult to push by the shopper, especially when the cart is fully loaded.

An improvement over the continuously operable friction brake is the selectively operable hub brake for wheelchairs disclosed in the Rodaway patent. A helical spring surrounds a brake drum, with one end of the spring being connected with the wheelchair frame and the other end connected with an actuating linkage which when operated exerts a pulling force on the spring to contract it against the wheel hub, thereby providing braking action.

While the Rodaway device operates satisfactorily, it is not capable of automatic braking when left unattended. It also requires precise manufacturing tolerances and awkward adjustment with respect to the starting point of brake engagement which reduces its reliability and increases its cost.

The present invention was developed in order to overcome these and other drawbacks of the prior art by providing an automatically operating wheel brake which is releasable without any conscious action on the part of the user which is simple to construct and operate and inexpensive to manufacture.

SUMMARY OF THE INVENTION

Accordingly, it is a primary object of the present invention to provide a wheel brake assembly including a hub adapted for rotation about a lateral axis and a spring mount on the hub for gripping and releasing the same. The spring includes a coil portion coaxial with the hub and first and second end portions which extend tangentially from the coil portion. Coaxially mounted on the spring coil portion are first and second annular disks each containing a recess. The first spring end is retained in the first disk recess and the second spring end is retained within the second disk recess. The first disk is stationary relative to the lateral axis while the second disk is rotated about the axis between a normal braking position where the spring ends are drawn together to constrict the spring coil portion against the hub to prevent rotation of the hub about the axis in a first direction and a release position wherein the spring ends are pushed apart to release the hub from the spring coil portion to enable rotation of the hub about the axis in either direction.

According to a more specific object of the invention, the second disk includes laterally extending actuator and stop pins which pass through slots in the stationary first disk. An actuator is connected with the actuator pin to rotate the second disk from the braking position to the release position. The stop pin arrests rotation of the second disk at the release position. A biasing spring is arranged between the first disk and the actuating pin of the second disk for biasing the second disk to the braking position.

It is yet another object of the invention to providing adjustment screws on the first disk to control the brake and release rotary positions of the second disk.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
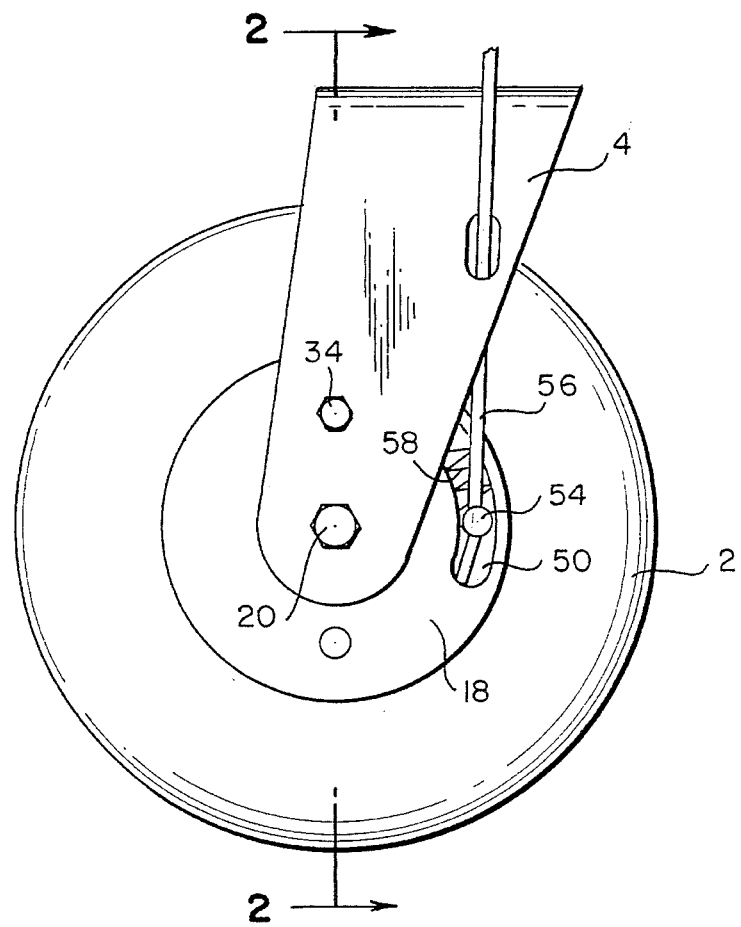
FIG. 1 is a front plan view of a wheel including the wheel brake assembly of the invention.
Figure 2:
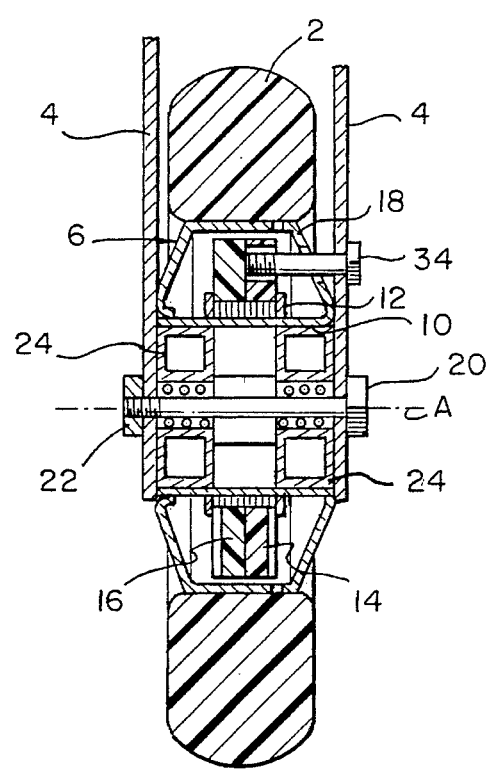
FIG. 2 is a sectional view of the wheel brake assembly taken along line 2—2 of FIG. 1.
Figure 3:
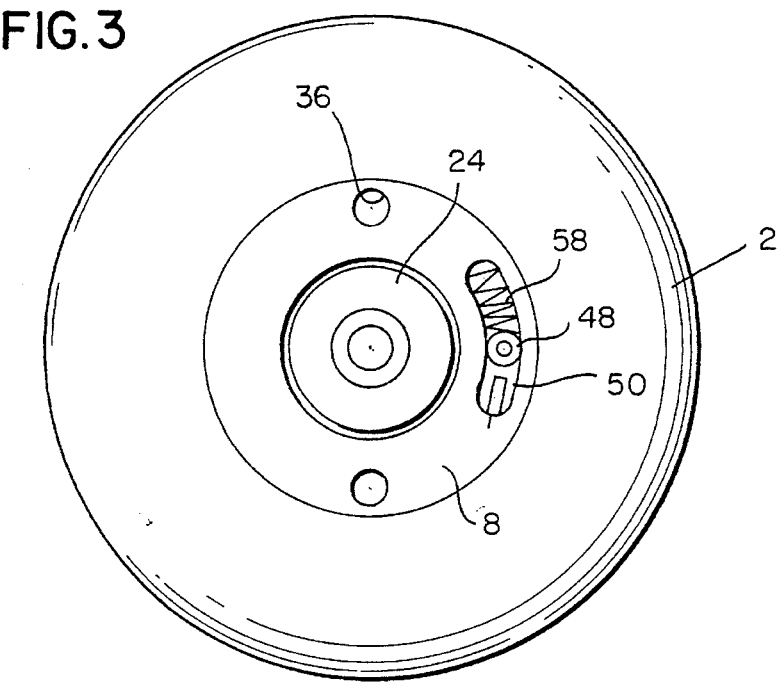
FIG. 3 is a front plan view of the wheel of FIG. 1 with the outer bracket removed.
Figure 4:
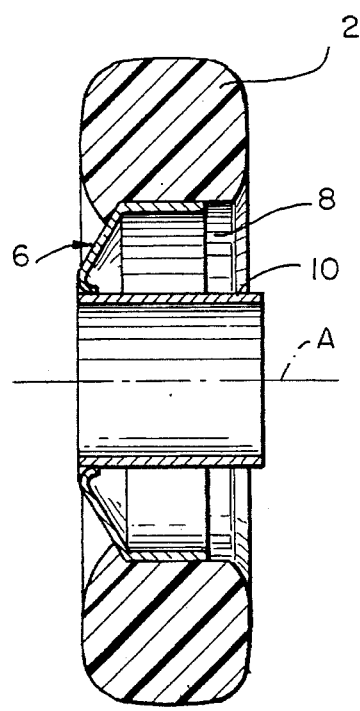
FIG. 4 is a sectional view of the wheel and wheel hub of the wheel brake assembly of FIG. 1.

Referring to FIGS. 1–4 there is shown a wheel 2 incorporating the brake assembly according to the invention. The wheel is connected with a bracket 4 which in turn is connected with the frame of a shopping cart or other vehicle, not shown. The wheel 2 is formed of a synthetic rubber or plastic material and is mounted on a metal hub 6 which is adapted for rotation about a lateral axis A as shown in FIGS. 2 and 4. The hub includes a cavity 8 between the wheel and a cylindrical portion 10 thereof. Within the cavity are arranged a brake spring 12, a first stationary annular disk 14, and a second rotatable annular disk 16. A cover 18 is provided to close the open end of the hub cavity 8.

The wheel and brake assembly are connected with the bracket 4 via a bolt 20 which is coaxial with the lateral axis A as shown in FIG. 2. A nut 22 secures the bolt 20 relative to the bracket 20. Within the hub 6 are provided bearings 24 which enable the hub 6 and wheel 2 to rotate about the axis A.

Figure 5:
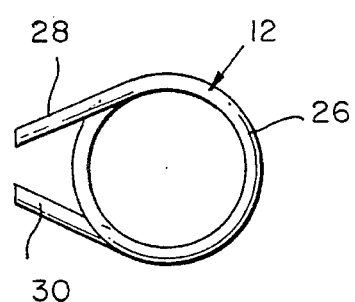
FIGS. 5 and 6 are end and front views, respectively, of the braking spring of the wheel brake assembly.
Figure 6:
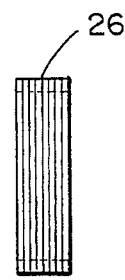

As shown in FIG. 2, the brake spring 12 is coaxially mounted on the hub cylindrical portion 10. The spring includes a coil portion 26 and, first and second end portions 28, 30 which extend tangentially from the coil portion as shown more particularly in FIGS. 5 and 6. The spring is formed of any suitable material, preferably metal, and the inner diameter of the spring coil portion corresponds generally with the outer diameter of the hub cylindrical portion 10. The first and second annular disks 14, 16 are arranged in contiguous relation and coaxially mounted on the spring coil portion. The disks are formed of a synthetic plastic material and preferably have a relatively low coefficient of friction. The first disk 14 contains a threaded or clearance hole 30 (shown more particularly in FIGS. 7–9) for receiving a threaded bolt 34. The bolt is threaded through an opening in the bracket 4 and an opening 36 in the cover 18 and secures the first disk in a stationary position so that the first disk can not rotate with respect to the axis A.

Figure 7:
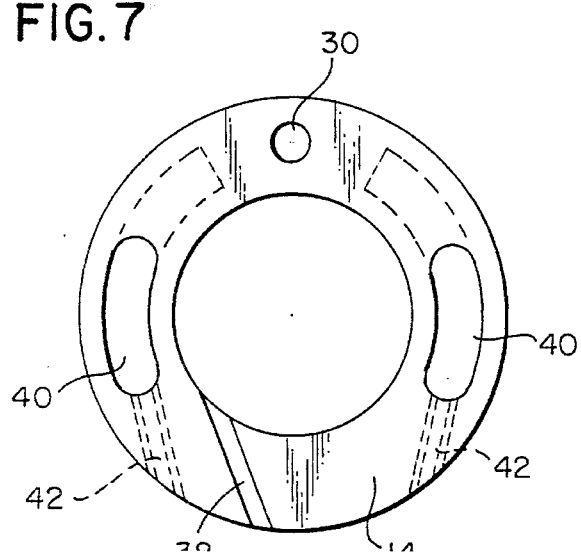
FIGS. 7, 8, and 9 are front, side, and rear views, respectively, of the first disk of the wheel brake assembly.
Figure 8:
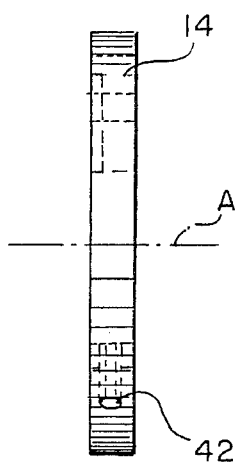
Figure 9:
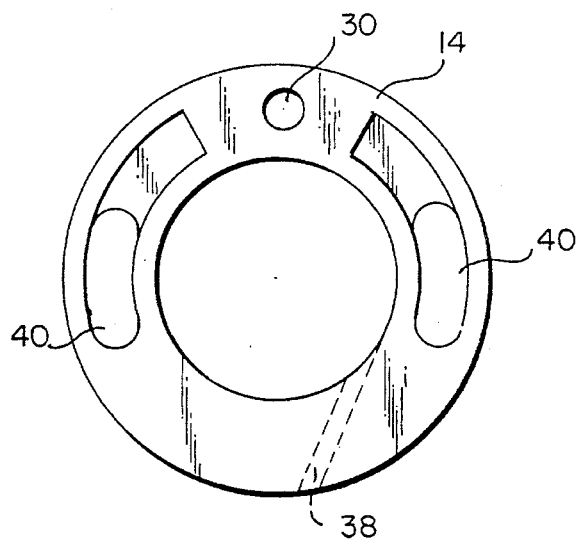

Referring now to FIGS. 7–9, the first annular disk 14 includes a recess 38 adapted to receive and retain the first end 28 of the brake spring. As will be developed below, the first disk also contains opposed slots 40 and threaded bores 42 communicating with the slots.

Figure 10:
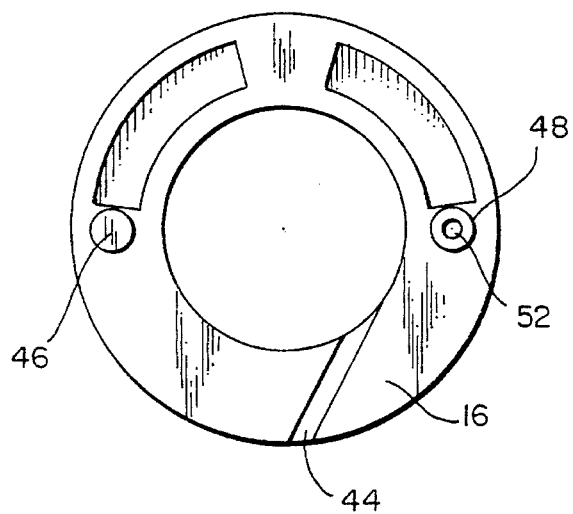
FIGS. 10 and 11 are front and side views, respectively, of the second disk of the wheel brake assembly.
Figure 11:
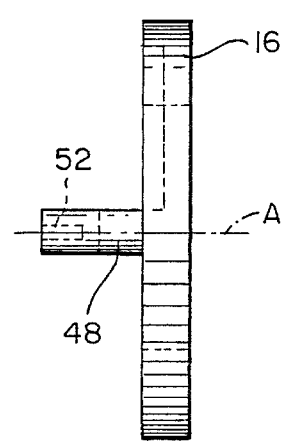

The second annular disk 16 is shown in detail in FIGS. 10 and 11. It also includes a recess 44 to receive and retain the second end 30 of the coil spring. Extending laterally from the front surface of the second disk are a stop pin 46 and an actuator pin 48 which are arranged diametrically opposite one another.

Both disks have an inner diameter corresponding with the outer diameter of the coil portion 26 of the brake spring 12 to hold the spring in place on the wheel hub cylindrical portion 10. The outer diameter of the disks 14, 16 is slightly less than the diameter of the hub cavity 8 so that the disks fit within the cavity as shown in FIG. 2. The stop and actuator pins 46, 48 of the second disk pass through the slots 40 of the first disk when the disks are mounted on the spring in contiguous relation. The actuator pin 48 is longer than the stop pin 46 and extends through a slot 50 in the cover 18. Moreover, the actuator pin 48 of the second disk 16 contains a threaded opening 52 for receiving a screw 54 to connect an actuator 56 with the actuator pin 48 as shown in FIG. 1. As will be described in more detail below, the actuator may comprise a cable or rod and is operable to rotate the second disk about the axis A between a normal braking position and a release position.

Figure 12:
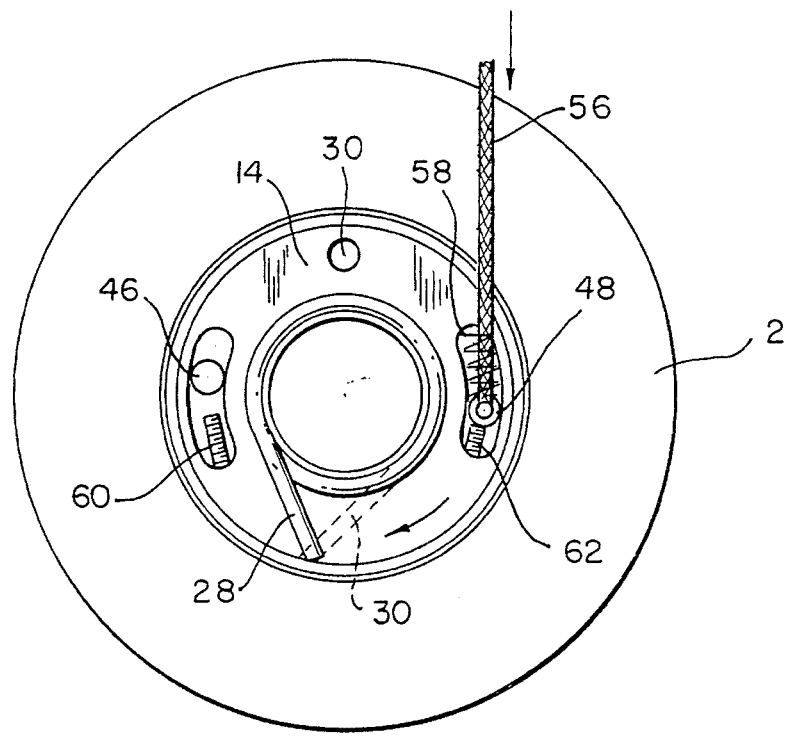
FIGS. 12 and 13 are front plan views of the wheel brake assembly in its brake and release positions, respectively.
Figure 13:
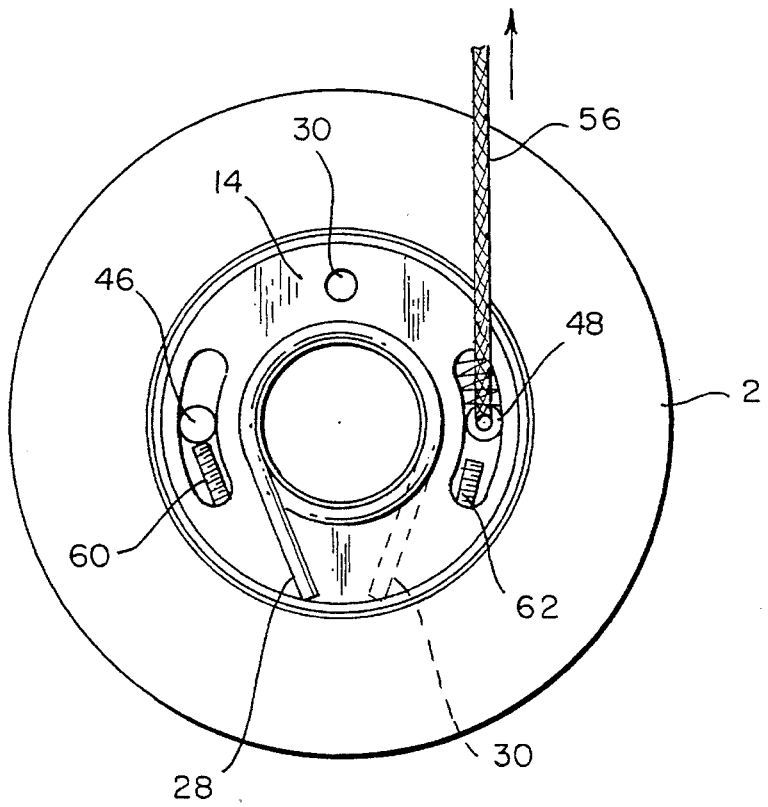

The second disk 16 is biased to its braking position by a biasing spring 58 arranged in a slot 40 of the first disk 14. The spring extends between the first disk and the actuator pin 48 as shown in FIG. 3. Adjustment screws 60, 62 are arranged in the threaded bores 42 of the first disk as shown in FIGS. 12 and 13. The screws arrest rotation of the second disk in the brake and release positions. More particularly, the screw 60 is struck by the stop pin 46 of the second disk when the second disk is in the release position and screw 62 is struck by the actuator pin 48 of the second disk when the second disk is in the brake position. The release and brake positions are thus adjusted by adjusting the screws 60, 62, respectively.

In operation, the wheel brake assembly is normally in a brake condition (FIG. 12) because the spring 58 biases the actuator pin 48 and thus the second disk to the braking position. In this position, the ends 28, 30 of the brake spring are drawn together to constrict the spring coil portion against the hub to prevent rotation of the hub about the axis in the forward direction. When the actuator 56 is pulled upwardly, the second disk rotates against the force of the bias spring 58 toward the release position where the stop pin 46 abuts against the screw 60. The brake spring ends 28, 30 are spread apart (FIG. 13) owing to movement of the second end 30 with the second plate and the brake spring coil portion releases the hub enabling the hub to rotate about the axis.

When used on a grocery cart, the actuator 56 of the wheel brake assembly is preferably connected with the cart handle which is designed with a limited degree of play. Pushing on the handle or rotation of the handle results in a small pull on the actuator 56 to rotate the second disk toward the release position. Only a small rotation (i.e. on the order of 0.125 in.) of the second disk is needed to release the spring from the hub. When the shopping cart handle is released, the second disk automatically rotates back to the brake position of FIG. 12.

The brake assembly of the invention can be designed for "right or left orientation of the actuator pen depending on the desired configuration of the cart. Wheel brakes can be included on both rear wheels of the cart if desired. A unique feature of the invention is that owing to the orientation of the brake coil, rotation of the wheel hub in one direction (i.e. rearward) can be afforded at all times, even without operation of the actuator, if desired.

While in accordance with the provisions of the patent statutes the preferred forms and embodiments of the invention have been illustrated and described, it will be apparent to those of ordinary skill in the art that various changes and modifications may be made without deviating from the inventive concepts set forth above.

What is claimed is:

1. A wheel brake assembly, comprising (a) a wheel hub adapted for rotation about a lateral axis;

(b) a spring mounted on said hub for gripping and releasing said hub, said spring including a coil portion coaxial with said hub and first and second end portions extending tangentially from said coil portion;

(c) first and second annular disks coaxially mounted on said spring coil portion, each of said disks containing a recess, said first spring end being arranged within said first disk recess and said second spring end being arranged within said second disk recess, said first disk being stationary relative to the axis; and (d) means for rotating said second disk about the axis between a normal braking position wherein said spring ends are drawn together to constrict said spring coil portion against said hub to prevent rotation of said hub about the axis in a first direction and a release position wherein said spring ends are pushed apart to release said hub from said spring coil portion enabling rotation of said hub about the axis.

2. A wheel brake assembly as defined in claim 1, wherein said second disk includes a laterally extending actuator pin and said rotating means includes an actuator connected with said pin.

3. A wheel brake assembly as defined in claim 2, wherein said first disk contains a first slot for receiving said actuator pin, and further comprising means arranged within said first slot between said first disk and said actuator pin for biasing said actuator pin and said second disk to said braking position.

4. A wheel brake assembly as defined in claim 3, wherein said second disk includes a laterally extending stop pin for stopping rotation of said second disk in the release position.

5. A wheel brake assembly as defined in claim 4, and further comprising adjustable means connected with said first disk for controlling the degree of rotation of said second disk between the release and braking positions.

6. A wheel brake assembly as defined in claim 2, and further comprising means connected with said first disk for preventing rotation thereof relative to the axis.

7. A wheel brake assembly as defined in claim 6, and further comprising bearing means connected with said hub.

8. A wheel brake assembly as defined in claim 6, wherein said first and second disks are formed of a lightweight synthetic plastic material.

9. A wheel brake assembly as defined in claim 6, wherein said actuator comprises a flexible cable.

10. A wheel brake assembly as defined in claim 2, wherein said actuator rotates said second disk at least 0.125 inches to the release position.

* * * * *